May 2, 1961   F. A. GROSS   2,982,954
RADAR SYSTEM FOR PRODUCING A REMOTE PLAN POSITION INDICATION
Filed April 29, 1947   2 Sheets-Sheet 1

MANUAL CONTROL FOR PHASE ADJUSTMENT

INVENTOR
FRITZ A. GROSS
BY
ATTORNEY

May 2, 1961 F. A. GROSS 2,982,954
RADAR SYSTEM FOR PRODUCING A REMOTE PLAN POSITION INDICATION
Filed April 29, 1947 2 Sheets-Sheet 2

INVENTOR
FRITZ A. GROSS
BY
ATTORNEY

United States Patent Office

2,982,954
Patented May 2, 1961

2,982,954

RADAR SYSTEM FOR PRODUCING A REMOTE PLAN POSITION INDICATION

Fritz A. Gross, Weston, Mass., assignor to Raytheon Company, a corporation of Delaware Filed Apr. 29, 1947, Ser. No. 744,663

12 Claims. (Cl. 343—6)

This invention relates to electrical systems, and more particularly to a remote-indicating detecting or object-locating system of the so-called radar type.

An object of this invention is to drive a rotating detecting element and a remote rotating indicating means in synchronism with each other.

Another object is to devise a means for transmitting, from a rotating detecting element to a remote indicating means, a signal indicative of the angular position of the detecting element.

A further object is to drive a rotatable detecting means and a remote rotatable indicating means from a common source of alternating electrical energy.

A still further object is to devise a system for driving a rotatable detecting means and a remote indicating means in synchronism with each other, said system including means for producing at said indicating means a fiducial indication representative of a predetermined angular position of the detecting element, thereby indicating the relative angular position of the detecting element and the indicating means.

Yet another object is to drive a rotating directional antenna and a remote rotating indicating means in synchronism with each other.

An additional object is to transmit a signal, representative of the angular position of a rotating directional antenna, to a remote indicating station.

Still another object is to devise a system for driving a remote rotatable indicating means in synchronism with a rotating directional antenna, said system including means for indicating, at the remote point, the angular position of said antenna, and also including means for varying the angular position of the indicating means relative to the antenna, whereby said indicating means may be brought into the desired proper angular position with respect to the antenna.

A further object is to transmit the angular position of a rotating directional search antenna to a remote point at which is located a rotatable indicating means, along with signals representative of echoes received at said antenna and also power for rotating said indicating means.

The foregoing and other objects of the invention will be best understood from the following description of an exemplification thereof, reference being had to the accompanying drawings, wherein.

Figure 1:
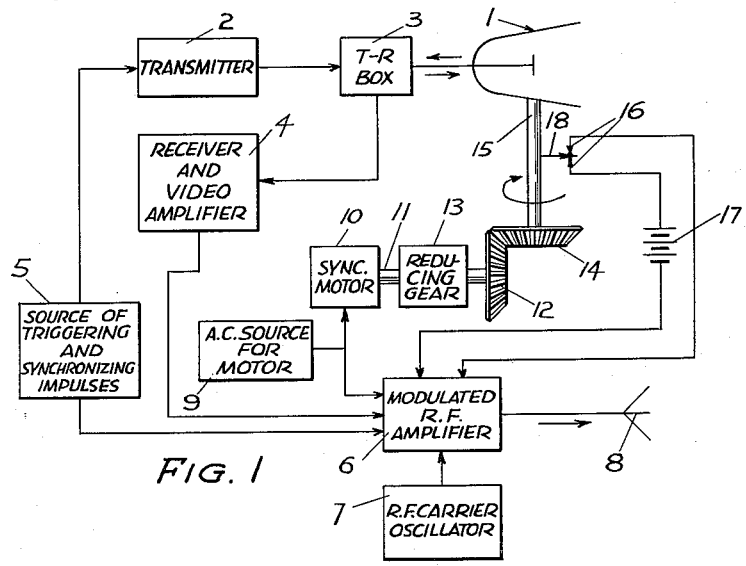
Fig. 1 is a schematic representation of a detecting and transmitting station according to the invention.

Referring now to Fig. 1, which represents a pulse-echo radio detecting and ranging (radar) apparatus, a directional search antenna 1 is connected to the output of a radio-frequency transmitter 2, through a T—R box or protective device 3, and is also connected, through said box, to the input of a receiver and video amplifier 4. Antenna 1 is therefore arranged to both transmit and receive radio-frequency energy, and T—R box 3 functions both to keep high-energy-level transmitted pulses away from receiver 4 and to prevent low-energy-level received pulses from reaching transmitter 2. Transmitter 2 is triggered, or caused to produce short periodic pulses of radio-frequency energy, by a source of triggering impulses 5, the output of which is connected to said transmitter. The output of the source of synchronizing impulses 5 is also connected to a modulated radio-frequency amplifier 6 which is supplied by a radio-frequency carrier oscillator 7, so that the synchronizing impulses produced by source 5 modulate the radio-frequency carrier, this modulated carrier being then amplified and transmitted from communication antenna 8. A synchronizing impulse, having the same length as a triggering impulse and therefore also having the same length as the radio-frequency impulse transmitted from antenna 1, is produced by source 5 simultaneously with each triggering impulse, and is transmitted from antenna 8.

It is known that objects located in the path of the beam of radio-frequency pulses transmitted from antenna 1 will reflect such pulses, and that the length of time between the transmitted pulse and its rearrival at the receiver as a reflected pulse is proportional to the distance of the reflecting object from the antenna 1.

Therefore each pulse transmitted from antenna 1 which is reflected from an object causes a corresponding reflected pulse to appear at the input of receiver and video amplifier 4, these reflected pulses being amplified in said amplifier and also being modulated onto the radio-frequency carrier in element 6 and being transmitted from antenna 8. Source 5 produces pulses at a rather high repetition rate, on the order of 500 to 1000 pulses per second for example, so that the synchronizing impulses applied to element 6, and also the reflected impulses, both have rather high repetition rates.

Antenna 1 is mounted for rotation around a vertical axis, in the direction of the arrow for example, and in order to rotate this detecting element or antenna at a predetermined speed, a source 9 of alternating current energy of a suitable frequency, 60 cycles for example, supplies a synchronous motor 10 the output shaft 11 of which is coupled to a bevel gear 12 through a reducing gear train 13. Gear 12 meshes with a bevel gear 14 which is fastened to vertical shaft 15 on which antenna 1 is mounted. As long as source 9 is connected to motor 10, antenna 1 is rotated around a vertical axis at a certain predetermined rather slow speed.

Alternating current source 9 is also connected to modulator 6, and as a result the radio-frequency carrier wave produced by oscillator 7 is also modulated by alternating current power at the frequency of source 9.

A pair of spaced stationary contacts 16 is mounted adjacent shaft 15, and these contacts are connected in series with a source 17 of direct current, for example a battery, and modulator 6, so that when and as long as a circuit is completed between said contacts, a direct current impulse is produced which is used to modulate the radio-frequency carrier and is thereby transmitted as a signal from antenna 8. An insulated contactor 18 is fixed to rotating shaft 15, this contactor being arranged to close the circuit between contacts 16 once during each revolution of shaft 15, and at the same time during each revolution, that is, when directional search antenna 1 has a predetermined angular position, or is pointing in a predetermined direction. It is thus seen that battery 17, contacts 16, contactor 18, and the circuit associated therewith, constitute a means for transmitting a signal indicative of the angular position of detecting element 1, since an impulse is produced and transmitted thereby once during each revolution of shaft 15, when element 1 has a predetermined angular position. Contactor 18 is designed to close contacts 16 for a time at least equal to the interval between successive impulses of source 5, although the time during which contacts 16 are closed may be several times said interval.

To recapitulate, the radio-frequency carrier wave of oscillator 7 is modulated by four different types of signals: synchronizing impulses from source 5, reflected impulses from receiver 4, low-frequency power from source 9, and antenna-position pulses from source 17.

Figure 2:
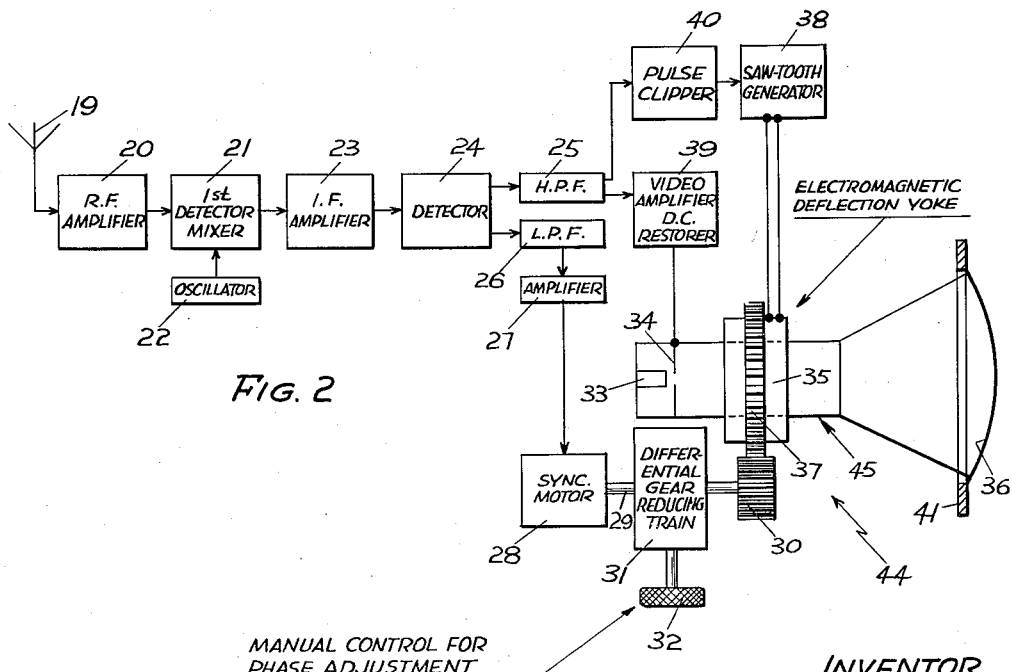
Fig. 2 is a schematic representation of a receiving and indicating station according to the invention.

Now referring to Fig. 2, which represents a remote receiving and indicating station at which it is desired to indicate the presence and position of the reflecting objects detected by the apparatus of Fig. 1, a receiving antenna 19, which may be omni-directional as is the antenna 8, constitutes the receiving end of the communication channel which connects the detecting and transmitting station of Fig. 1 with the remote receiving and indicating station of Fig. 2. One of the two stations may be mobile while the other may be relatively stationary or fixed. For example, the apparatus of Fig. 1 could be located on the ground, transmitting the so-called "picture" to an aircraft in which is located the apparatus of Fig. 2, or the apparatus of Fig. 1 could be located in an aircraft, transmitting the picture to a ground station at which is located the apparatus of Fig. 2.

The modulated signal picked up by receiving antenna 19 is passed through a radio-frequency amplifier 20 to a first detector and mixer 21, in which said signal is mixed with the output of an oscillator 22 to reduce said signal to a convenient intermediate frequency. The intermediate frequency signal is then passed through an intermediate-frequency amplifier 23 to a detector 24, which in effect removes the carrier from the signal, giving at the output of said detector only the modulations themselves.

It is well to recall, at this point, the character of the signal modulations of the carrier. The members of the first group of signals, that is, the antenna position impulses, the synchronizing impulses, and the impulses representing reflecting objects, all have periodicities or lengths of the order of 1/500 to 1/1000 second or at most a few thousandths of a second, while the second group, that is the power signal from source 9, has a periodicity which is much greater, on the order of 1/60 second. Therefore, the first group of signals can be readily and simply separated from the composite signal modulations by utilizing a high pass filter 25, at the output of which will appear only the first group of signals; similarly, the second group of signals can be readily and simply separated from the composite signal modulations by utilizing a low-pass filter 26, at the output of which will appear only the second group or the power signal from source 9.

The low-frequency power at the output end of filter 26 is amplified in amplifier 27 and is then used as an alternating current power supply for synchronous motor 28. Since the power signal from source 9 is used to supply both synchronous motors 10 and 28, it will be seen that these motors will rotate at the same speed. The output shaft 29 of motor 28 drives a spur gear 30 through a differential gear reducing train 31. This differential gear train 31 has a handwheel control 32, which is a manual control for phase adjustment and is coupled into said differential gear train in such a manner that by manual operation of handwheel 32 the angular position of gear 30 may be varied with respect to shaft 29, and this may be conveniently done, while shaft 29 and gear 30 are continuously rotating, by momentarily decreasing or increasing the speed of rotation of gear 30.

The indicating means, denoted generally by numeral 44, is of the so-called Plan Position Indicator (PPI) type.

A cathode-ray tube 45 has mounted at one end thereof an electron gun 33 which projects a beam or stream of electrons through a control grid 34 and a rotatable deflecting coil or yoke 35, said beam impinging on a fluorescent screen 36 at the opposite enlarged end of said tube to produce a spot of light thereon. Coil 35 is mounted for rotation around the longitudinal axis of tube 45, and is rotated continuously by means of an annular or ring gear 37 which is fixed to yoke 35 and meshes with driving gear 30. At this point, it is desired to be made clear that the gear ratio of gear train 13—12—14 is made equal to that of gear train 31—30—37, so that yoke 35 is rotated at the same angular velocity as search antenna 1, since synchronous motors 10 and 28 are both supplied from the same source and therefore rotate at the same angular velocity. Yoke 35 includes a pair of oppositely-disposed pole pieces mounted at right angles to the axis of tube 45, so that when a sawtooth voltage from generator 38 is applied to deflecting coil 35, with said pole pieces in a fixed position, the cathode-ray beam of tube 45 will be swept outwardly from the center of screen 36 along a radial path. If, now, the pole pieces of yoke 35 are rotated, a plurality of immediately adjacent but angularly-spaced radial paths will be swept out by the beam, the particular one being swept out by the beam at any instant corresponding to the particular angular position of yoke 35 at that instant. Since the angular velocity of yoke 35 is equal to that of antenna 1, the particular radial path being swept out by the electron beam at any instant will correspond to a predetermned angular position of the search antenna 1 at the same instant, if the yoke 35 has when first put into operation been properly phased or angularly positioned with respect to shaft 29, and therefore also with respect to antenna 1, by adjustment of handwheel 32.

The output of high pass filter 25 is applied to two different elements of the receiving apparatus, the first being a video amplifier 39, which includes a direct current restorer, and the second being a pulse clipper 40, which also includes a direct current restorer.

Figure 3:
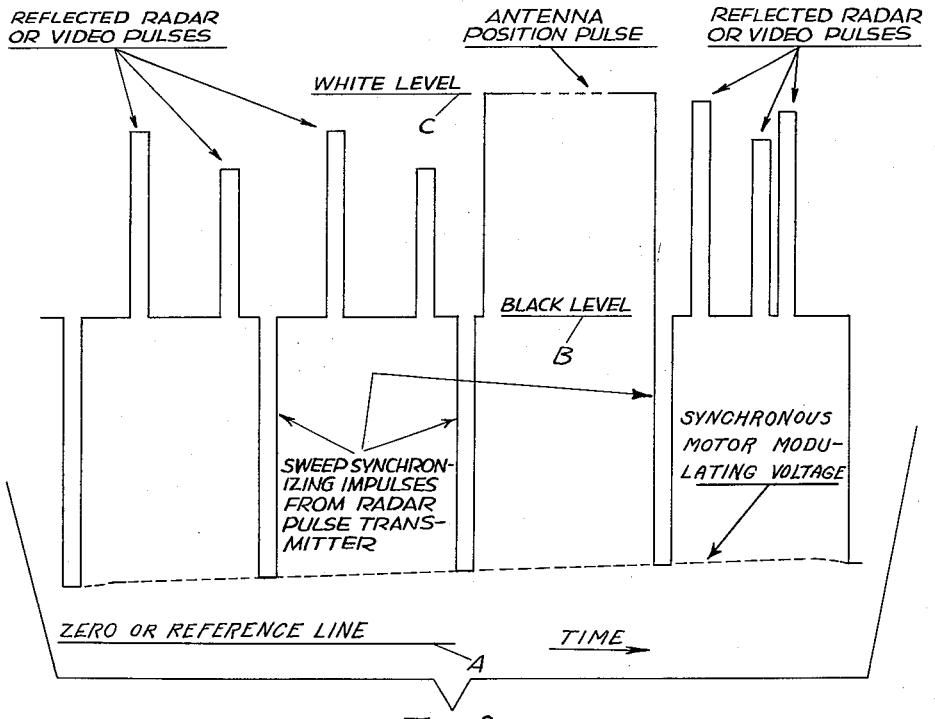
Fig. 3 is a representation of a typical series of modulating signals which might be transmitted from the station of Fig. 1.

The video amplifier 39 allows the entire video signal or wave to pass therethrough. Fig. 3 represents a typical series of modulating signals which might be transmitted from the station of Fig. 1, and which would then appear at the output of detector 24. From a consideration of this figure, the mode of operation of the invention will become more readily apparent. All of the pulses depicted in Fig. 3 are above the zero or reference line A, although some of the pulses are more positive than others. The dotted substantially sinusoidal curve, of low frequency, in the lower part of this figure, indicates one way to modulate the carrier by the alternating current motor source 9. This dotted curve represents a 60-cycle modulation of the amplitude of the triggering or sweep synchronizing impulses. A modulation on the order of only 10 percent is required, and, since the repetition rate of the sweep synchronizing impulses is on the order of 1000 per second, a nice envelope of 60 cycles (or whatever relatively low synchronous motor excitation frequency is used) could be obtained. For example, with 60 cycles there would be $$\frac{1000}{60}$$

or 16⅔ pulses, to form the sine wave, this number of pulses being ample for the purpose.

The video portion of the signal illustrated in Fig. 3 is in the so-called positive-picture phase and in this form is capable of direct application to the control grid 34 of the cathode ray tube 45; consequently, the output of video amplifier 39 is connected directly to said control grid. The sweep synchronizing impulses, which are transmitted to the remote receiving station from source 5 and which, as described above, occur in exact synchronism with the pulses of radio-frequency energy transmitted from search antenna 1, extend downwardly from a horizontal line B marked "black level," to a level determined by the sinusoidal variation of source 9, as explained above, and recur periodically at a reptition rate determined by the periodicity of pulse generator 5. It may be seen that these impulses provide the least (positive) voltage on the control grid 34 of all of the pulses in Fig. 3.

The reflected radar or video impulses, which are transmitted to the remote receiving station from receiver amplifier 4 (assuming there are reflecting objects within the beam of radio-frequency energy transmitted from antenna 1), occur after each transmitted or sweep synchronizing impulse, the time interval elapsing between the transmitted impulse and each reflected impulse being proportional to the distance of the corresponding reflecting object from search antenna 1. These reflected impulses extend upwardly from level B, are of the same shape as the transmitted or sweep synchronizing impulses, and the amplitude of each reflected impulse depends upon both the distance and the reflecting characteristics of the corresponding reflecting object. These reflected impulses ordinarily recur periodically, at a rate determined by the periodicity or repetition rate of the transmitted or sweep synchronizing impulses. The positive voltage provided by these reflected pulses on control grid 34 is substantially larger than that provided by the sweep synchronizing impulses.

As described above, an antenna position pulse is transmitted to the remote receiving station from source 17 once during each revolution of antenna 1, when said antenna is beamed in a certain predetermined azimuthal direction, north for example. This pulse extends upwardly from level B to a horizontal line C marked "white level," is of a shape determined by the spacing and configuration of contacts 16 and contactor 18, and has a positive voltage amplitude determined by the voltage of source 17, this amplitude being the highest of all of the pulses in Fig. 3. The antenna position pulse has a length at least equal to the interval between successive sweep synchronizing impulses provided by source 5, although the length of said position pulse may be several times said interval. Due to the limitations of space, the full length of said pulse is not shown in Fig. 3.

The control grid 34 of the cathode ray tube 45 is biased by enough negative voltage from any suitable source (not shown) so that, whenever a voltage less positive than that indicated by level B is applied to said grid, the electron beam is prevented from reaching the fluorescent screen 36. Since the electron beam is entirely cut off for voltages less positive than level B, no light at all appears on the screen for such grid voltages; therefore, level B is called the black level. The sweep-synchronizing impulses of Fig. 3 are less positive than level B, as will be seen, so that such impulses allow the grid 34 to be driven to a negative voltage even greater than that necessary for electron beam cut-off. Therefore, the unwanted sweep synchronizing impulses that ride through the video amplifier 39 with the wanted reflected radar pulses need not be removed because they do not interfere in any way with the action of the control grid in producing the desired "picture" on the fluorescent screen 36. Even though some of the sweep-synchronizing impulses have smaller amplitude than the others, due to the amplitude modulation of the same by source 9, even those with the minimum amplitude extend well below the "black level" B, since the sinusoidal low-frequency modulation is only of the order of 10 percent; therefore, such pulses do not and cannot interfere with the desired "picture."

The reflected radar or video pulses and the antenna position pulse are all more positive than level B and, during these portions of the video signal, the electron beam is permitted to impinge on the screen with varying amounts of electrons, the number of electrons permitted to impinge on the screen during any such pulse, and therefore the light emitted from the screen during any such pulse, corresponding to the positive voltage amplitude of the pulse above level B. Since the antenna position pulse has the highest amplitude of any of the pulses of Fig. 3, and since this is the highest possible pulse amplitude, level C may be called the white level; during the reception of the antenna position pulse, therefore, an extremely bright area is produced on the fluorescent screen 36. During the reception of the reflected radar or video pulses, electrons will be permitted to impinge on the screen 36, so that said screen will be brightened during these times also.

The reception of the antenna position pulse at grid 34 does not interfere appreciably with the reception of reflected pulses, since the first synchronizing impulse after the cessation of the position pulse causes the electron beam of the tube 45 to resume its controlled radial sweeps. During the reception of said position pulse the electron beam is swept radially by, and at a rate determined by the natural frequency of the synchronizing oscillator included in block 38, since during this time the sweep synchronizing impulses are not effective to control the radial sweep circuit 38.

The pulse clipper 40 acts to separate or clip the sweep-synchronizing impulses from the rest of the video portion of the wave of Fig. 3, so that only the sweep synchronizing impulses are passed through to the synchronizing oscillator and sawtooth generator 38, the output of which is connected to the electromagnetic deflection coil 35. The amplitude of the sweep synchronizing impulses, although in some cases reduced by the sinusoidal variation of modulating voltage source 9, is in no case reduced sufficiently to interfere in any way with the clipping action of clipper 40. A pulse from the synchronizing oscillator controls the action of the sawtooth generator and, through it, the sweep of the electron beam across screen 36. The oscillator itself is controllable by the sweep synchronizing impulses in the video wave of Fig. 3. As explained above, a sawtooth voltage applied to deflection coil 35 causes the electron beam of the tube 45 to sweep outwardly radially from the center of screen 36, and, as the sawtooth wave is repeated, the electron beam is first swept radially outwardly from the screen center and is then brought rapidly back to the center for another outward radial sweep. Due to the action of the synchronizing oscillator, which is, in turn, controlled by the sweep-synchronizing impulses passed through pulse clipper 40, a radial sweep of the electron beam is commenced each time a sweep synchronizing impulse is received. It will be recalled that a sweep synchronizing impulse is transmitted from source 5, at the detecting station, simultaneously with the transmission of a pulse of radio-frequency energy from search antenna 1. Therefore, each radial sweep of the electron beam at the indicating station is commenced simultaneously with the transmission of a radio-frequency pulse from the search antenna. Since reflected impulses appear as bright spots on the cathode-ray tube screen, and since each beam sweep is begun at the time of transmission of the radio-frequency impulse, the radial distance of each bright spot from the center of screen 36 is proportional to the elapsed time between transmission of the pulse and reception of the echo; by a suitable calibration, the distance of each reflecting object from the antenna 1 may be read off directly on the face of tube 45 by determining the distance of each spot from the screen center.

Also, as explained above, as a result of the rotation of yoke 35 at the same angular velocity as search antenna 1, the particular radial path being swept out by the electron beam at any instant will correspond to a certain particular predetermined angular position of antenna 1 at the same instant, if yoke 35 has been properly phased with respect to antenna 1 when the receiving and indicating station was first put into operation. If this initial phasing has been properly done in the manner to be explained hereinafter, the detecting and indicating systems, though separated from each other, will remain absolutely synchronized with each other because synchronous motors 10 and 28 are both supplied from the same alternating current source 9. Therefore, the direction of each reflecting object relative to antenna 1 may also be ascertained by determining the relative angular position on the tube face of the corresponding spot. To assist in this directional determination, an annular scale 41, circumferentially surrounds the screen 36, this scale being marked (see Figs. 4 and 5) with azimuthal indicia.

It will be recalled that during the reception of the antenna position pulse, an extremely bright area is produced on screen 36, due to the application to grid 34 of the high positive voltage antenna position pulse at this time. This antenna position pulse is transmitted to the indicating station once during each revolution of antenna 1 and when said antenna points in a predetermined direction, such as north for example. Since this pulse has a length equal to at least the time interval between two successive synchronizing impulses provided by source 5, the electron beam of tube 45 will be allowed to impinge on screen 36 throughout at least one radial sweep of said beam, thereby producing a bright radial line on the screen. In other words, the radial path being swept out by the electron beam at this time is made visible. Such a fiducial line is indicated at 42 in Fig. 4, which is a view looking at the face of the cathode ray tube 45.

Figure 4:
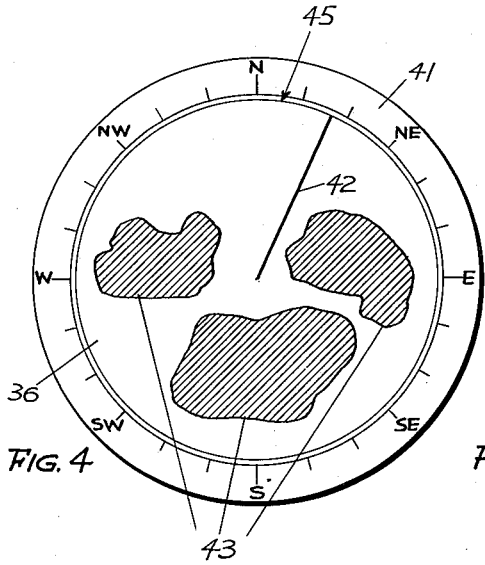
Fig. 4 is a view of the receiver cathode-ray tube face representing an out-of-phase condition.
Figure 5:
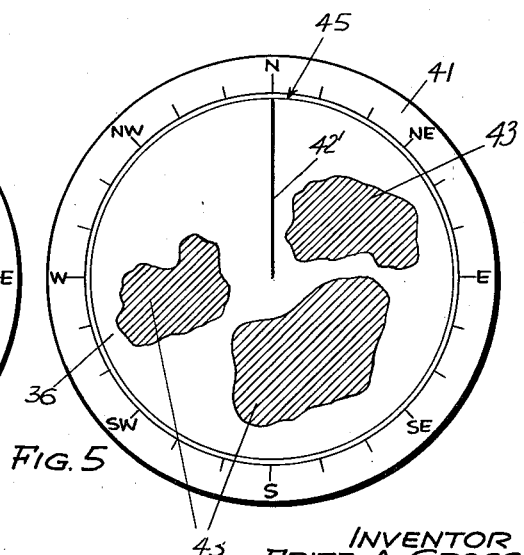
Fig. 5 is a view similar to Fig. 4 but representing an in-phase condition.

Since the antenna position pulse is produced and transmitted from the detecting station as antenna 1 goes by north, Fig. 4 represents an out-of-phase condition, or one in which the angular position of coil 35 at any instant does not correctly correspond to the angular position of antenna 1 at that same instant. This is made readily apparent to the operator at the indicating station from the fact that fiducial line 42 does not point north on the tube face but, as shown, points somewhat to the east of north. In Fig. 4, the spots of light denoted by 43 illustrate detected objects within range of the object-detecting apparatus of Fig. 1.

If the indicating means of Fig. 2 does not correspond in angular position at every instant to the azimuthal position of antenna 1 at the same instant, the directions of the objects 43 read from scale 41 would be in error. However, the existence of this incorrect phase relation is readily apparent to the operator, because of the incorrect position of fiducial line 42. In order to obtain the proper phase relation of yoke 35 with respect to antenna 1, the operator at the indicating station moves handwheel 32, thus varying the angular relation between yoke 35 and shaft 29 of motor 28, and thereby also between said yoke and antenna 1. The fiducial line moves angularly on the screen 36 while handwheel 32 is being moved, because the position of the line depends upon the position of yoke 35 when the antenna position impulse is received at control grid 34. The operator adjusts handwheel 32 until the fiducial line points north, as shown at 42′ in Fig. 5. As the fiducial line moves angularly on the screen, the objects 43 also move angularly through a corresponding angle, because the objects remain fixed in position and therefore always have the same azimuthal bearing from antenna 1, measured from north or the predetermined fiducial direction of said antenna. The aforesaid movement of spots 43 will be apparent from a comparison of Figs. 4 and 5.

By the alignment of this fiducial indication 42′ to north on scale 41, the yoke 35 is brought into the in-phase condition with respect to antenna 1, and the indicating means at the receiving station of Fig. 2 is brought into the angular relation which properly corresponds to the direction of antenna 1. Thereafter, the indicating means will stay in complete synchronism with antenna 1, because synchronous motor 28, which drives yoke 35, is supplied from alternating current source 9, which also supplies synchronous motor 10, which drives the search antenna 1.

Of course, it is to be understood that this invention is not limited to the particular details as described above, as many equivalents will suggest themselves to those skilled in the art. For example, although the receiving station of Fig. 2 indicates that amplitude modulation is used to apply the signals at the transmitting station to the carrier, frequency modulation could be used equally well. In such a case, of course, the conventional limiter and discriminator would be used at the receiving station of Fig. 2 to convert the frequency-modulated signals to amplitude-modulated signals. Various other veriations will suggest themselves. It is accordingly desired that the appended claims be given a broad interpretation commensurate with the scope of this invention within the art.

What is claimed is:

1. A remote-indicating detecting system, comprising a detecting and transmitting station including a rotatable detecting element, a remote receiving and indicating station including a rotatable indicating means, means at said first station including a source of alternating electrical energy for rotating said detecting element at a predetermined speed, means for transmitting information in the form of electric pulses from said detecting and transmitting station to said indicating station, means including means to modulate the peak amplitude of certain of said pulses in accordance with said alternating electrical energy for transmitting power from said source to said second station, synchronous motor means at said second station supplied by such transmitted power for rotating said indicating means in synchronism with said detecting element, and means at said first station for transmitting to said second station, at a predetermined angular position of said detecting element, a signal indicative of the angular position of said detecting element.

2. A remote-indicating radar system, comprising an object-detecting and signal-transmitting station, a remote receiving and indicating station, and a communication channel between said stations; said first station including a rotatable directional search antenna, transmitting and receiving means connected to said antenna for supplying energy pulses thereto for transmission therefrom and for receiving reflected energy pulses indicative of objects therefrom, and means including a source of alternating electrical energy for rotating said antenna at a predetermined speed; said second station including rotatable indicating means and a synchronous motor for rotating said indicating means; means for transmitting over said channel from said first station to said second station said pulses for application to said indicating means, and means to modulate the peak amplitude of certain of said pulses in accordance with said alternating electrical energy and thereby to transmit power from said source for supplying said motor.

3. A remote-indicating radar system, comprising an object-detecting and signal-transmitting station, a remote receiving and indicating station, and a communication channel between said stations; said first station including a rotatable directional search antenna, transmitting and receiving means connected to said antenna for supplying energy pulses thereto for transmission therefrom and for receiving reflected energy pulses indicative of objects therefrom, means including a source of alternating electrical energy for rotating said antenna at a predetermined speed, and means for producing a signal indicative of a predetermined angular position of said antenna; said second station including rotatable indicating means and a synchronous motor for rotating said indicating means; means for transmitting over said channel from said first station to said second station said pulses for application to said indicating means, and said signal for application to said indicating means to produce a fiducial indication thereon, and means to modulate the peak amplitude of certain of said pulses in accordance with said alternating electrical energy and thereby to transmit power from said source for supplying said motor.

4. A remote-indicating pulse radar system, comprising a radar and signal transmitting station including a rotatable antenna, means for generating and applying to said station triggering impulses for timing the transmission of radar pulses from said station, means for receiving and detecting echo signals produced by said radar pulses, means including a source of alternating electrical energy for rotating said antenna at a predetermined speed, means for generating and transmitting a carrier radio wave from said transmitting station, and means for modulating said carrier radio wave by said triggering impulses, said detected echo signals, and said source of alternating electrical energy, a remote receiving and indicating station including a rotatable indicating means, sweep means for timing the occurrence of echo signals on said indicating means, synchronous motor means for rotating said indicating means, means for receiving said carrier wave and for detecting the modulation components thereof, means for applying the triggering impulse modulation component to said sweep means for initiating its operation, means for applying the echo signal modulation components to said indicating means for producing an indication thereof, and means for applying the alternating electrical energy modulation component to said motor for rotating said indication means in synchronism with said antenna.

5. A system in accordance with claim 4 including means for generating an impulse at a predetermined angular position of said antenna, means for modulating said carrier radio wave with said impulse and means at the remote station for applying the modulation component of said impulse to said indicating means to produce an indication thereon indicative of the angular position of said antenna.

6. A remote-indicating detecting system, comprising a detecting and transmitting station including a rotatable detecting element, a remote receiving and indicating station including a rotatable indicating means, means at said first station including a source of alternating electrical energy for rotating said detecting element, means for transmitting information in the form of electric pulses from said detecting and transmitting station to said indicating station, means including means to modulate the peak amplitude of certain of said pulses in accordance with said alternating electrical energy for transmitting power from said source to said second station, and synchronous motor means at said remote station supplied by such transmitted power for rotating said indicating means in synchronism with said detecting element.

7. A remote-indicating radar system, comprising an object detecting station having a rotatable directional antenna, means including a source of alternating electrical energy for rotating said antenna, signal transmitting means at said station including a source of carrier wave energy, a source of radar sweep synchronizing pulses, a receiver for echoes, means for modulating said carrier wave energy with a series of pulses corresponding to the radar sweep synchronizing pulses and with pulses of opposite polarity corresponding to received echoes, and means for modulating the amplitude of the pulses of said series in accordance with said alternating energy.

8. A remote-indicating radar system, comprising an object detecting station having a rotatable directional antenna, means including a source of alternating electrical energy for rotating said antenna, signal transmitting means at said station including a source of carrier wave energy, a source of radar sweep synchronizing pulses, a receiver for echoes, means for modulating said carrier wave energy with a series of pulses corresponding to the radar sweep synchronizing pulses and with pulses of opposite polarity corresponding to received echoes, and means for modulating the amplitude of the pulses of said series in accordance with said alternating energy, said last-named modulation being limited to a peak amplitude of substantially ten percent of the peak amplitude of said pulses of said series.

9. A remote-indicating radar system, comprising an object detecting station having a rotatable directional antenna, means including a source of alternating electrical energy for rotating said antenna, signal transmitting means at said station including a source of carrier wave energy, a source of radar sweep synchronizing pulses, a receiver for echoes, means for modulating said carrier wave energy with a series of pulses corresponding to the radar sweep synchronizing pulses and with pulses of opposite polarity corresponding to received echoes, means for modulating the amplitude of the pulses of said series in accordance with said alternating energy, a receiving and indicating station having signal receiving means arranged to receive the carrier wave energy and demodulate the same, means at said receiving station to separate the pulses from the alternating energy wave, a rotatable indicating device at said receiving station, and means at said receiving station employing the alternating energy wave to rotate said indicating device in synchronism with the antenna at the object detecting station.

10. A remote indicating radar system, comprising an object detecting station having a rotatable directional antenna, means including a source of alternating electrical energy for rotating said antenna, signal transmitting means at said station including a source of carrier wave energy, a source of radar sweep synchronizing pulses, a receiver for echoes, means for modulating said carrier wave energy with a series of pulses corresponding to the radar sweep synchronizing pulses and with pulses of opposite polarity corresponding to received echoes, means coupled to said antenna for providing a fiducial pulse having a duration at least as great as that between two successive pulses of said series each time said antenna is directed in a particular direction, means to modulate said carrier wave energy with said fiducial pulse with the same polarity as said pulses corresponding to received echoes, and means for modulating the amplitude of the pulses of said series in accordance with said alternating energy.

11. A remote-indicating detecting system, comprising a detecting and transmitting station including a rotatable detecting element, a remote receiving and indicating station including a rotatable indicating means, means at said first station including a source of alternating electrical energy for rotating said detecting element, means for transmitting information in the form of electric pulses from said detecting and transmitting station to said indicating station, means including means to vary the peak amplitude of certain of said pulses in accordance with said alternating electrical energy for transmitting power from said source to said second station, and synchronous motor means at said remote station supplied by such transmitted power for rotating said indicating means in synchronism with said detecting element.

12. A remote-indicating detecting system, comprising a detecting and transmitting station including a rotatable detecting element, a remote receiving and indicating station including a rotatable indicating means, means at said first station including a source of alternating electrical energy for rotating said detecting element at a predetermined speed, means for transmitting information in the form of electric pulses from said detecting and transmitting station to said indicating station, means including means to vary the peak amplitude of certain of said pulses in accordance with said alternating electrical energy for transmitting power from said source to said second station, synchronous motor means at said second station supplied by such transmitted power for rotating said indicating means in synchronism with said detecting element, and means at said first station for transmitting to said second station, at a predetermined angular position of said detecting element, a signal indicative of the angular position of said detecting element.

References Cited in the file of this patent

UNITED STATES PATENTS

| | | |
|---|---|---|
| 2,272,607 | Higonnet | Feb. 10, 1942 |
| 2,406,751 | Emerson | Sept. 3, 1946 |
| 2,406,798 | Burroughs | Sept. 3, 1946 |
| 2,409,456 | Tolson | Oct. 15, 1946 |
| 2,412,669 | Bedford | Dec. 17, 1946 |
| 2,412,670 | Epstein | Dec. 17, 1946 |
| 2,421,747 | Engelhardt | June 10, 1947 |
| 2,422,975 | Nicholson | June 24, 1947 |
| 2,502,215 | Giffen et al. | Mar. 28, 1950 |
| 2,519,935 | Smith et al. | Aug. 22, 1950 |